United States Patent [19]

Takeuchi et al.

[11] Patent Number: 5,319,467

[45] Date of Patent: Jun. 7, 1994

[54] VIDEO TAPE RECORDER FOR RECORDING A VIDEO SIGNAL WITH AN ADDITIONAL TIME-BASE REFERENCE SIGNAL

[75] Inventors: Akihiro Takeuchi, Ikoma; Masaaki Kobayashi, Kawanishi, both of Japan

[73] Assignee: Matsushita Electric Industrial Co., Ltd., Osaka, Japan

[21] Appl. No.: 757,463

[22] Filed: Sep. 10, 1991

[30] Foreign Application Priority Data

Sep. 14, 1990 [JP] Japan ................... 2-244313

[51] Int. Cl.⁵ .................................. H04N 9/79
[52] U.S. Cl. .................. 358/326; 358/323; 348/505
[58] Field of Search ........... 358/326, 320, 323, 19, 358/327, 310, 20, 25, 33, 319; H04N 9/79

[56] References Cited

U.S. PATENT DOCUMENTS

| | | | |
|---|---|---|---|
| 4,516,160 | 5/1985 | Kanamaru | 358/326 |
| 4,544,943 | 10/1985 | Quan | 358/326 |
| 4,663,659 | 5/1987 | Blatter | 358/326 |
| 4,807,056 | 2/1989 | Sasaki et al. | 358/327 |

FOREIGN PATENT DOCUMENTS

| | | |
|---|---|---|
| 0289046 | 11/1988 | European Pat. Off. . |
| 1172713 | 6/1964 | Fed. Rep. of Germany . |
| 1248710 | 8/1967 | Fed. Rep. of Germany . |
| 2711766 | 8/1978 | Fed. Rep. of Germany . |
| 2908501 | 9/1980 | Fed. Rep. of Germany . |
| 61-46681 | 3/1986 | Japan . |
| 61-252791 | 11/1986 | Japan . |
| 62-13182 | 1/1987 | Japan . |
| 62-234478 | 10/1987 | Japan . |
| 63-61577 | 3/1988 | Japan . |

*Primary Examiner*—Tommy P. Chin
*Assistant Examiner*—Khoi Truong
*Attorney, Agent, or Firm*—Wenderoth, Lind & Ponack

[57] ABSTRACT

An apparatus for recording a video signal onto tracks of a recording tape includes circuitry for producing a first time-base reference signal which is a color burst signal composed of a first predetermined number of sinewave cycles and a second time-base reference signal which is a burst signal composed of a second predetermined number of sinewave signals. The second predetermined number of cycles is larger than the first predetermined number of cycles. The apparatus further includes superimposing circuitry for superimposing the first time base reference signal on an input video signal at intervals of a horizontal scanning period of the video signal and for superimposing the second time base reference signal on the input video signal at intervals of a predetermined number of horizontal scanning periods of the video signal. The apparatus further includes a modulator for modulating an output signal of the superimposing circuitry to obtain a modulated signal and a recording arrangement for recording the modulated signal onto the tracks of the recording tape.

4 Claims, 8 Drawing Sheets

VIDEO TAPE RECORDER FOR RECORDING A VIDEO SIGNAL WITH AN ADDITIONAL TIME-BASE REFERENCE SIGNAL

BACKGROUND OF THE INVENTION

1. Field of the Invention

The present invention relates to a video tape recorder (VCR) of the helical scanning rotary head type for recording and reproducing video signals.

2. Description of Prior Art

A known component type VCR for recording and reproduction of video signals employs a method in which a timebase reference for the video signal is produced by inserting several sinewaves of color burst (referred to as a burst wave) after a negative synchronizing (sync) pulse for one horizontal scanning period, prior to frequency modulation of the video signal for recording.

In reproduction of the video signal with this method, a zero-cross point of the burst wave in a demodulated video signal is detected for producing a playback pulse following a timebase variation. The playback pulse then actuates a PLL circuit to produce a playback clock signal.

The demodulated video signal containing a timebase variation is converted to a digital signal by an A/D converter controlled by the playback clock and stored in a memory. It is then read out from the memory by a reference clock which carries no timebase variation so that a resultant reproduced video signal is free from timebase variation.

However, the burst wave which is used for timebase correction is inserted in each horizontal scanning period and the timebase frequency of the NTSC system becomes as low as about 15 KHz. If the video signal is timebase extended for each horizontal scanning period and is recorded on a plurality of channels, the timebase frequency will further be decreased to about 7.5 KHz.

When the timebase correction is carried out at such a low frequency, its response speed will remain low. Accordingly, an abrupt timebase change caused by the switching of heads affects video data recorded in the beginning of each recording track. This develops a duration, equal to a multiple of H (H: horizontal scanning period), where no timebase variation can be corrected throughout several horizontal scanning periods. As the result, a visual failure known as skew distortion will appear in the upper portion of a reproduced image.

For eliminating the above failure, a modified method has been proposed as disclosed in laid-open Japanese Patent Application No. S63-61577, in which a negative signal which is longer in duration than a negative sync pulse provided in each horizontal scanning period is inserted in the beginning of each track prior to recording, and this negative signal is detected for timebase correction during reproduction.

However, even if the duration of the negative signal is adequately long, only one edge is used as a timebase reference. This provides a precision of timing almost equal to that given by the negative sync pulse in each horizontal scanning period and the effect of skew distortion will hardly be eliminated.

SUMMARY OF THE INVENTION

It is an object of the present invention to avoid the generation of visual error known as skew distortion which appears in the upper portion of a reproduced image due to an abrupt timebase change in the beginning of a track caused by the switching of the heads.

According to an improved method of the present invention, in addition to a burst signal of sinewaves provided in each horizontal scanning period and acting as a first timebase reference signal, a series of sinewaves which is longer in duration than the burst signal is inserted into a video signal as a second timebase reference signal in 1H period prior to recording. During reproduction, a zero-cross point of the burst wave is detected for the correction of timebase variations and also, the second timebase reference signal is utilized for timebase correction of the beginning of each track at a high speed.

More particularly, the response of the timebase corrector during a timebase correcting action can be optimized in speed at the beginning of each track. Consequently, skew distortion resulting from an abrupt timebase change in the beginning of a track and appearing in the portion of a reproduced image will be minimized.

DESCRIPTION OF THE PREFERRED EMBODIMENT

Figure 1:
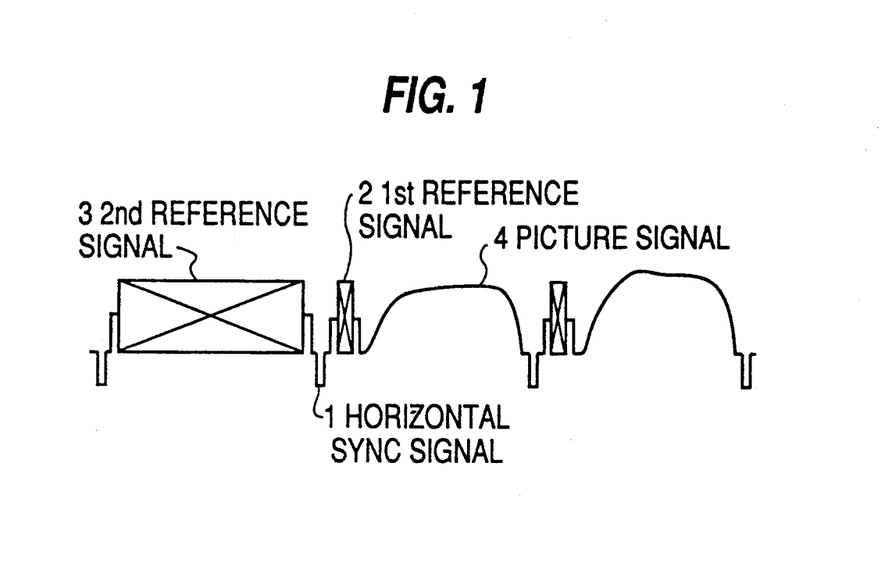
FIG. 1 is a waveform diagram of a reference signal associated with a recording/reproducing apparatus according to the present invention.

FIG. 1 is a waveform diagram showing three scanning line periods of a video signal recorded at the beginning of each recording track using a VCR of the present invention.

FIG. 1 shows a horizontal sync signal 1, a first timebase reference signal 2, a second timebase reference signal 3 which is added to only at the beginning region of each track, and a picture signal 4. Waveforms after the second scanning period are identical to that of the second scanning period which comprises the first timebase reference signal 2 and the picture signal 4.

Figure 2:
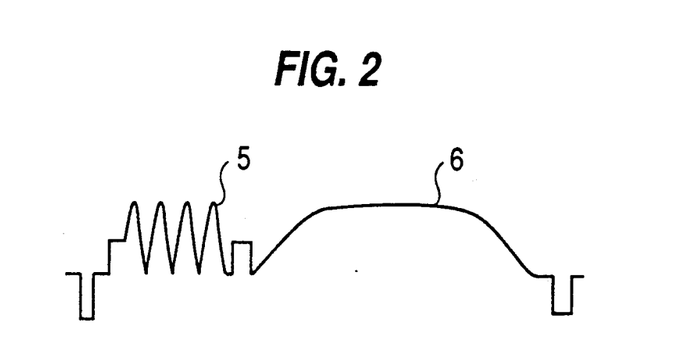
FIG. 2 is a waveform diagram of a first reference signal.

FIG. 2 is a waveform diagram showing in more detail the first timebase reference signal 2, in which denoted by 5 is a burst wave consisting of four sine-wave cycles.

Although the picture signal is a luminance signal 6 in this embodiment, it may be a chrominance signal or TDM signal formed by timebase multiplexing of two, chrominance and luminance, signals.

Figure 3:
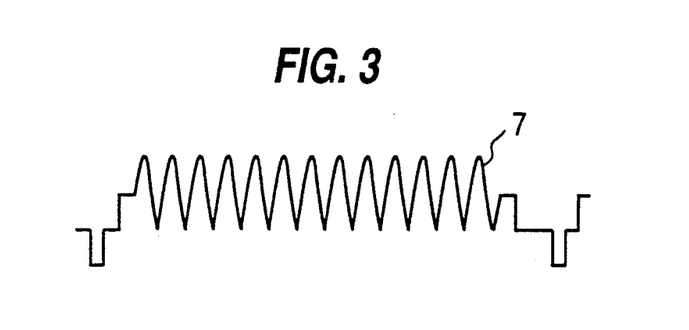
FIG. 3 is a waveform diagram of a second reference signal.

FIG. 3 is a waveform diagram showing the second timebase reference signal 3, in which denoted by 7 is a burst wave consisted of a greater number of sine-wave cycles than that of the first timebase reference signal 2 for timebase reference.

Figure 4:
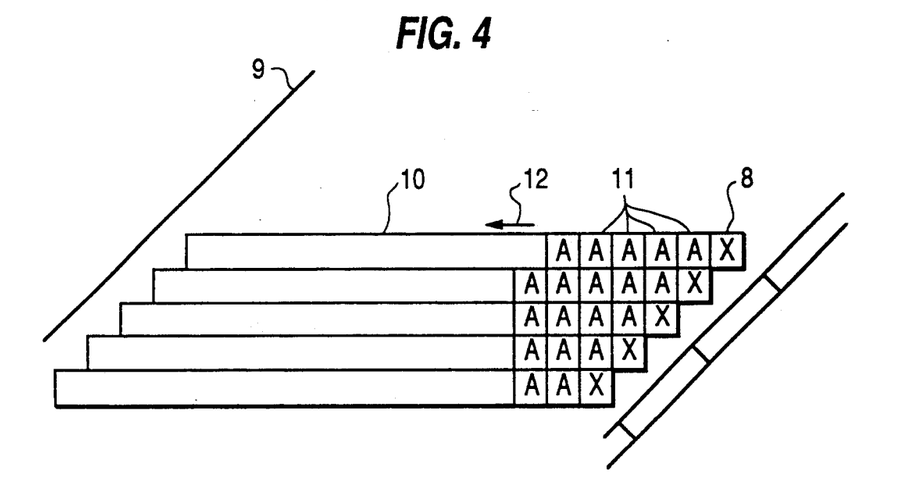
FIG. 4 is a view showing the recording pattern on a magnetic tape.

FIG. 4 illustrates the recording of those signals onto the recording tracks of a video tape 9. In particular, the second timebase reference signal 3 is allocated to a region 8 on a recording track 10 of the video tape 9. Each recording track contains at the beginning region thereof a video signal component X containing the second timebase reference signal 3.

Also, a series of video signal components A containing the first timebase signals 2 are recorded onto succeeding regions 11 of the recording track 10 respectively. It is assumed that the scanning with a recording head is carried out in the direction denoted by the arrow 12.

Figure 5:
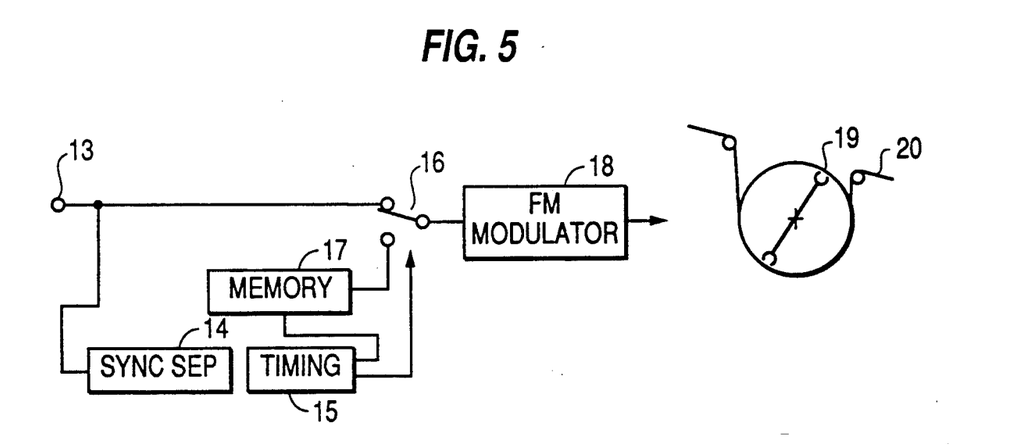
FIG. 5 is a block diagram illustrating one embodiment of the present invention.

FIG. 5 shows a block diagram of a recording section of the VCR of the present invention. In operation, an input video signal containing the first timebase reference signals 2 is fed through an input terminal 13 to a sync separator circuit 14 where sync pulses are separated from the input video signal. The sync pulses are transmitted to a timing generator circuit 15 which in turn actuates a switch 16 for switching from the output of a memory 17 to the input video signal at the timing of the front end of each recording track. Each group of video signal components headed by the signal X is then fed through an FM modulator 18 to a rotary head 19 for recording onto a video recording tape 20.

Figure 6:
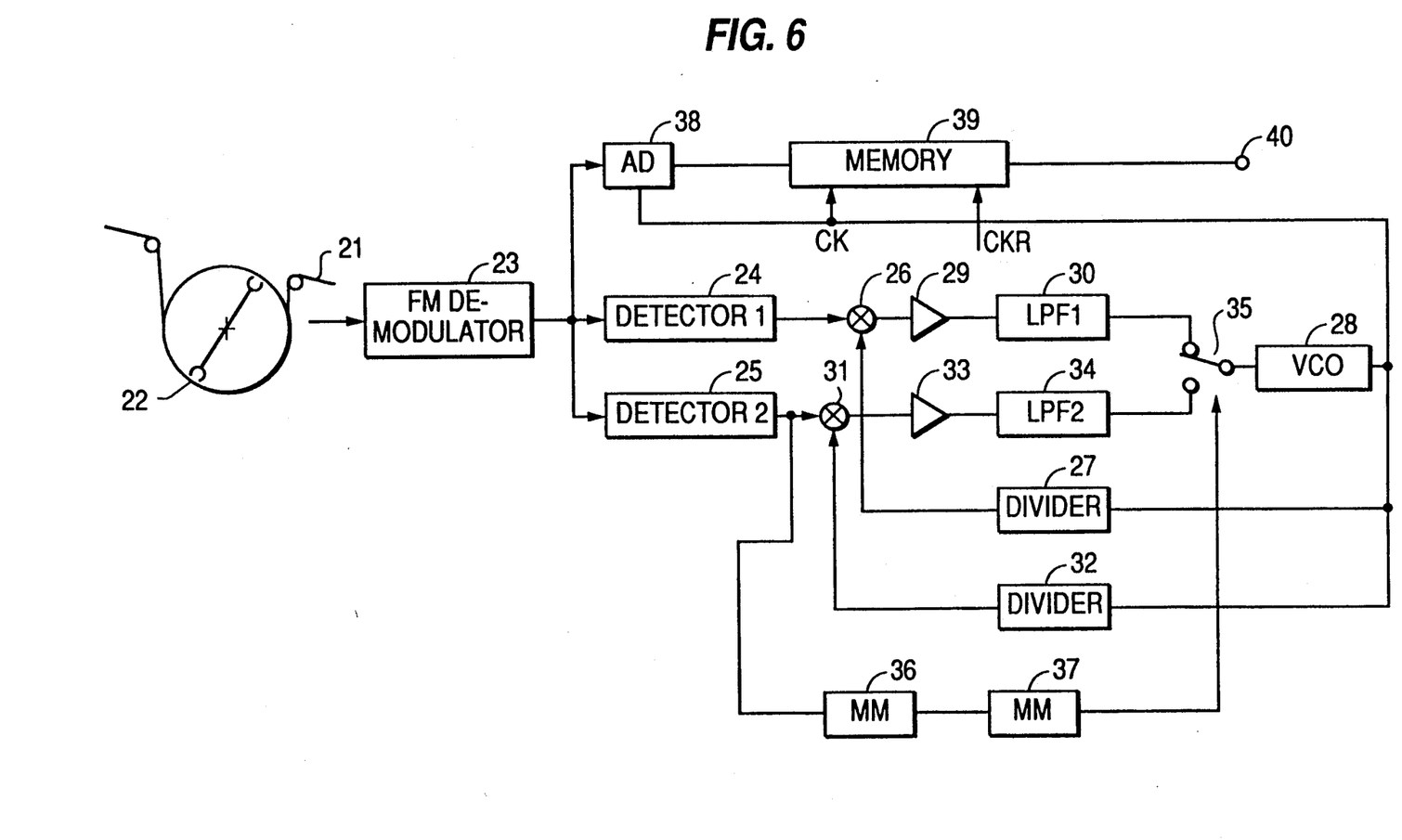
FIG. 6 is a block diagram of a timebase corrector in the apparatus of the present invention.

FIG. 6 is a block diagram of a timebase corrector (TBC) in the VCR of the present invention for a reproducing operation.

In action, a video signal read out from a recording tape 21 with a rotary head 22 is fed to an FM demodulator 23 where it is frequency demodulated. The resultant frequency demodulated video signal carrying timebase reference components is delivered to a first timebase reference signal detector 24 (referred to as a first detector hereinafter) for detecting the first timebase reference signal and a second timebase reference signal detector 25 (referred to as a second detector) for detecting the second timebase reference signal. The first detector 24; upon detecting the first reference signal for one horizontal scanning period produces a pulse whose duration is equal to the horizontal scanning period.

The frequency of the pulse is commonly about 15.73 KHz in the NTSC system. The pulse is transferred to a first phase comparator 26 where it is phase compared in each horizontal scanning period with the output of a voltage controlled oscillator (VCO) 28 which has been divided to about 15.73 KHz by a frequency divider circuit 27. The resultant output signal is then fed through an error amplifier 29 and a loop filter (low-pass filter) 30 (LPF 1) to the VCO 28.

Similarly, the second detector 25; upon detecting the second timebase reference signal of each track; produces a pulse which is equal in period to the reference sine wave. The pulse is transferred to a second phase comparator 31 where it is phase compared in each horizontal scanning period with the output of the VCO 28 which has been divided by a divider circuit 32. The resultant output signal is then fed through an error amplifier 33 and a loop filter 34 (LPF 2) to the VCO 28. When the frequency in the reference sine wave is a few megahertz higher than the frequency in the horizontal scanning period, the second loop filter (LPF 2) 34 can allow a higher frequency signal to pass than that of the first loop filter (LPF 1) 30; thus providing a faster response speed. Accordingly, the response to skew distortion developed in the front end of each track signal will be speedier.

A switch 35 is actuated to switch the loops because the second timebase reference signal is contained within the beginning region of each track signal. Its action is timed by a signal derived from the second detector 25 and passed through a pair of monostable multivibrators 36 and 37.

Also, the video signal is converted by an A/D converter 38 into a digital form which is then stored in a memory 39. The action of the A/D converter 38 and the memory 39 is triggered by a sampling clock signal and a write clock signal respectively which are both output in the form of CK outputs of the VCO 28. A signal retrieved from the memory 39 using a clock signal CKR which is constant in the phase contains no timebase variation and will be transmitted further from an output terminal 40.

When the frequency in the horizontal scanning period is 15.73 KHz, the frequency of an output of the VCO 28 becomes about 14.3 MHz after passing through the first divider circuit 27 having a dividing ratio of 910:1. If the second divider circuit 32 has a dividing ratio of 182:1, the frequency of the burst wave becomes 2.86 MHz.

It would be understood that the foregoing values are given as examples. When the video signal is a PAL or HDTV signal of different scanning lines, or a recorded signal which is divided into a plurality of channels for reduction of a frequency band and extended with time thus having a scanning period frequency different from that of its original signal, it will be processed with equal success by the foregoing arrangement of the present invention.

Figure 7:
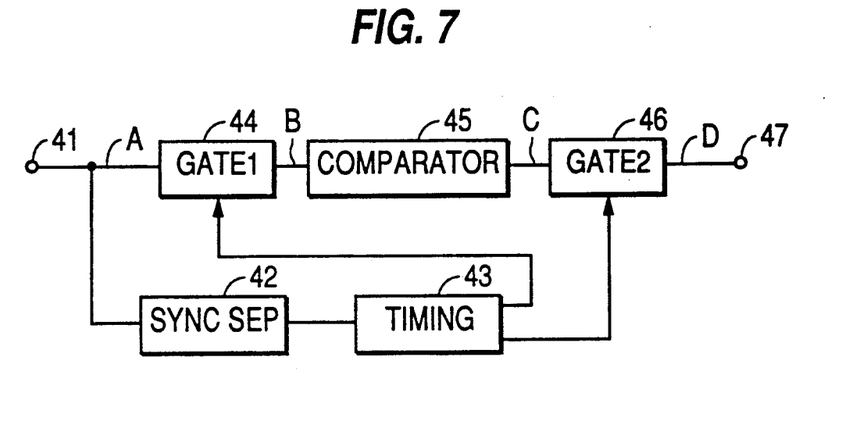
FIG. 7 is a block diagram of a first detector of the timebase corrector.
Figure 8:
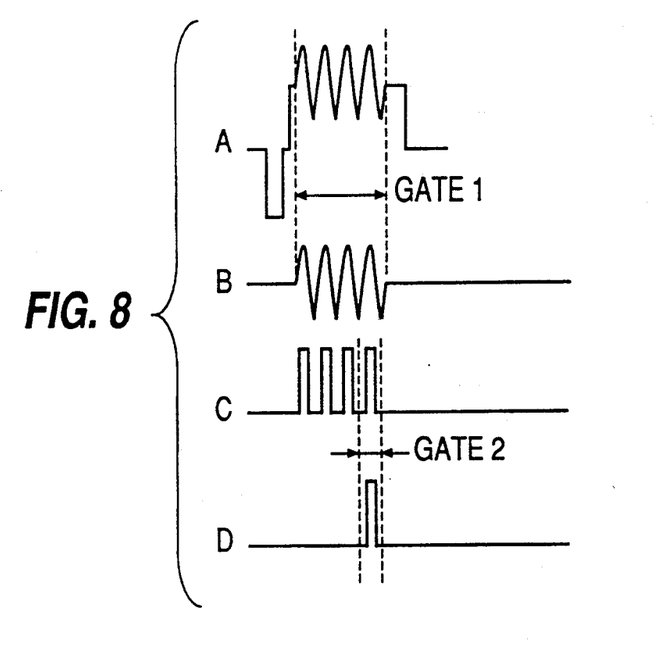
FIG. 8 is a waveform diagram of the first detector.

FIG. 7 is a block diagram of a detector employed for detection of the first timebase reference signal. An input video signal carrying the first timebase reference signal, whose waveform is shown in FIG. 8-A, is fed to an input terminal 41 and then, transferred to a first gate circuit 44 which is controlled by the combination of a sync separator circuit 42 and a timing circuit 43. The first gate circuit 44 converts a sinewave component of the video signal into a burst signal of a sinewave form shown in FIG. 8-B. The burst signal is waveform modulated to into a series of pulses by a comparator 45 provided for detection of a zero-cross point of the sinewave. One of the pulses is picked up by a second gate circuit 46 and delivered from an output terminal 47 as an output signal of the detector whose waveform is shown in FIG. 8-D.

Figure 9:
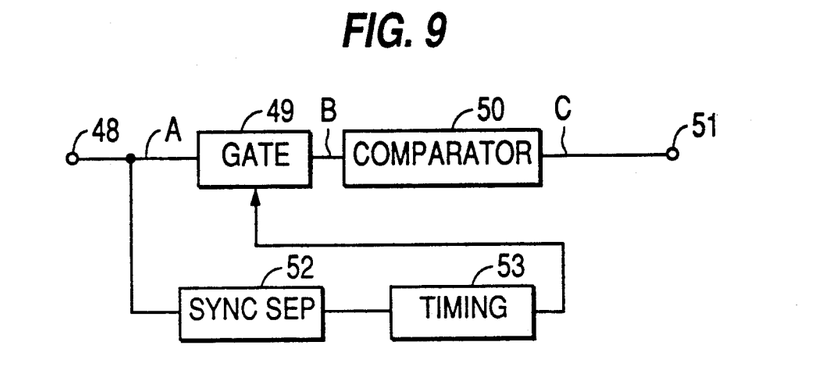
FIG. 9 is a block diagram of a second detector of the timebase corrector.
Figure 10:
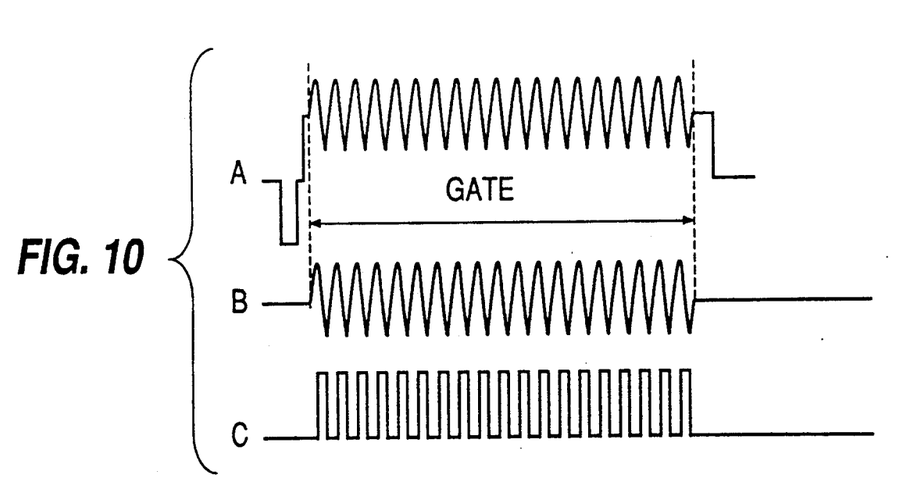
FIG. 10 is a waveform diagram of the second detector.

FIG. 9 is a block diagram of a detector employed for detection of the second timebase reference signal. An input video signal carrying the second timebase reference signal, of which waveform is shown in FIG. 10-A, is fed to an input terminal 48 and transferred to a gate circuit 49 where a sinewave component of the video signal is gated to produce a signal whose waveform is shown in FIG. 10-B. The resultant signal is then transferred to a comparator 50 where a zero-cross point of the signal is detected to produce a zero-cross signal shown in FIG. 10-C. The zero-cross signal is transmitted further from an output terminal 51. In action, the gate circuit 49 is controlled by a timing pulse produced by the combination of a sync separator circuit 52 and a timing circuit 53.

A timebase corrector in accordance with another embodiment of the present invention will now be described referring to FIG. 11. In operation, an input video signal which has been frequency demodulated and contains timebase reference signal components is fed to an input terminal 54 and transferred to both a first timebase reference signal detector 55 for detection of the first timebase reference signal and a second timebase reference signal detector 56 for detection of the second timebase reference signal.

Upon detecting the first timebase reference signal, the first timebase detector 55 having an arrangement similar to that shown in FIG. 6 produces a pulse whose duration is equal to the horizontal scanning period. The pulse is transferred to a first phase comparator 56 where it is phase compared in each horizontal scanning period with the output of a voltage controlled oscillator (VCO) 58 which is divided by a frequency divider 57. A resultant output is transferred through an error amplifier 59 and a loop filter (LPF) 60 to the VCO 58.

Similarly, the second timebase detector 56 upon detecting the second timebase reference signal carried in the beginning end of each track signal produces a pulse in each track. The pulse is fed to a phase control terminal 61 of the VCO 58 and to a preset terminal 62 of the divider 57. Consequently, the VCO 58 is reset in phase for oscillation and the divider 57 is preset in phase for dividing action. Also, the VCO 58 produces an output CK which serves as a sampling clock for an A/D converter 63 and a write clock for a memory 64, similar to that shown in FIG. 6. An output signal from the memory 64 is delivered from an output terminal 65.

As the result, the timebase corrector can provide a quicker response to the generation of skew distortion. Because the second timebase reference signal is longer in duration than the first timebase reference signal, the resultant pulses are less affected by unwanted signal components such as noise; thus exhibiting a higher accuracy. Hence, no phase error will be developed even if the response speed is high.

Figure 12:
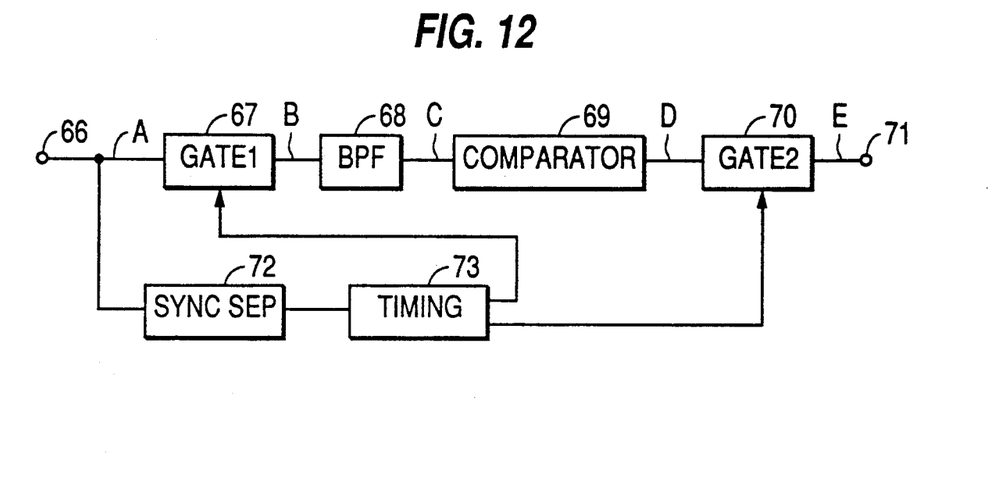
FIG. 12 is a block diagram of a second detector of the modified timebase corrector.
Figure 13:
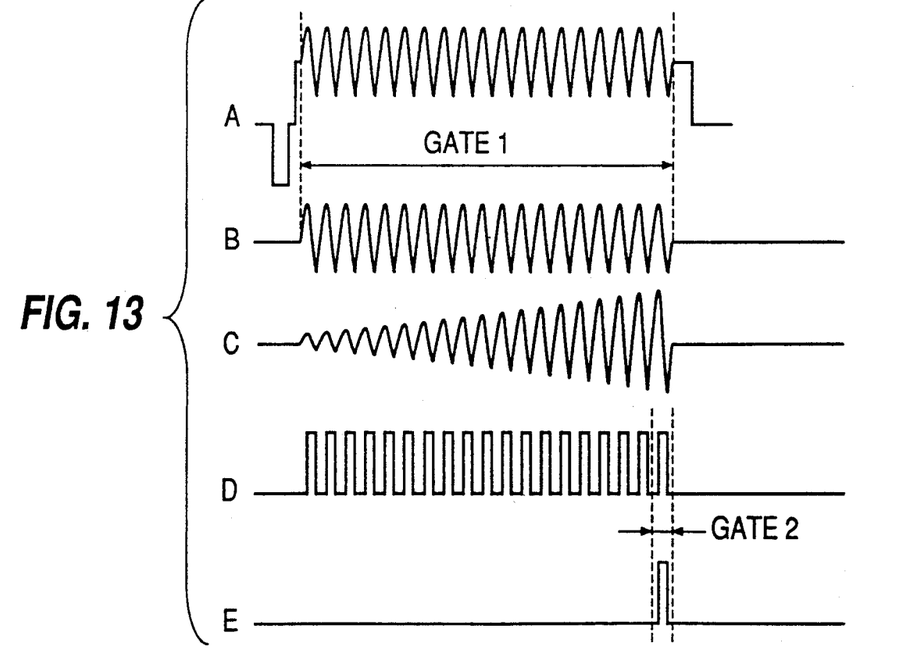
FIG. 13 is a waveform diagram of the second detector of the modified timebase corrector.

FIG. 12 is a block diagram of a detector for detection of the second timebase reference signal. In action, an input video signal carrying a second timebase signal component which waveform is shown in FIG. 13-A is fed to an input terminal 66 and transferred to a gate circuit 67 where a sinewave component of the input video signal is gated to produce a signal shown in FIG. 13-B. The resultant signal is then filtered into a signal waveform shown in FIG. 13-C by a bandpass filter 68 which can pass frequencies of the second timebase reference signal.

The signal waveform of FIG. 13-C exhibits an incremental shape of an envelope since the bandpass filter 48 allows a narrow range of frequencies to pass.

Then, the filtered signal is converted to a zero-cross signal, shown in FIG. 13-D, by a comparator 69 which can detect a zero-cross point in the signal. The zero-cross signal is transferred to a gate circuit 70 where it is gated to produce a detection pulse shown in FIG. 13-E for delivery from an output terminal 71. In action, the two gate circuits 67 and 70 are controlled by timing pulses produced by a sync separator circuit 72 and a timing circuit 73.

Figure 11:
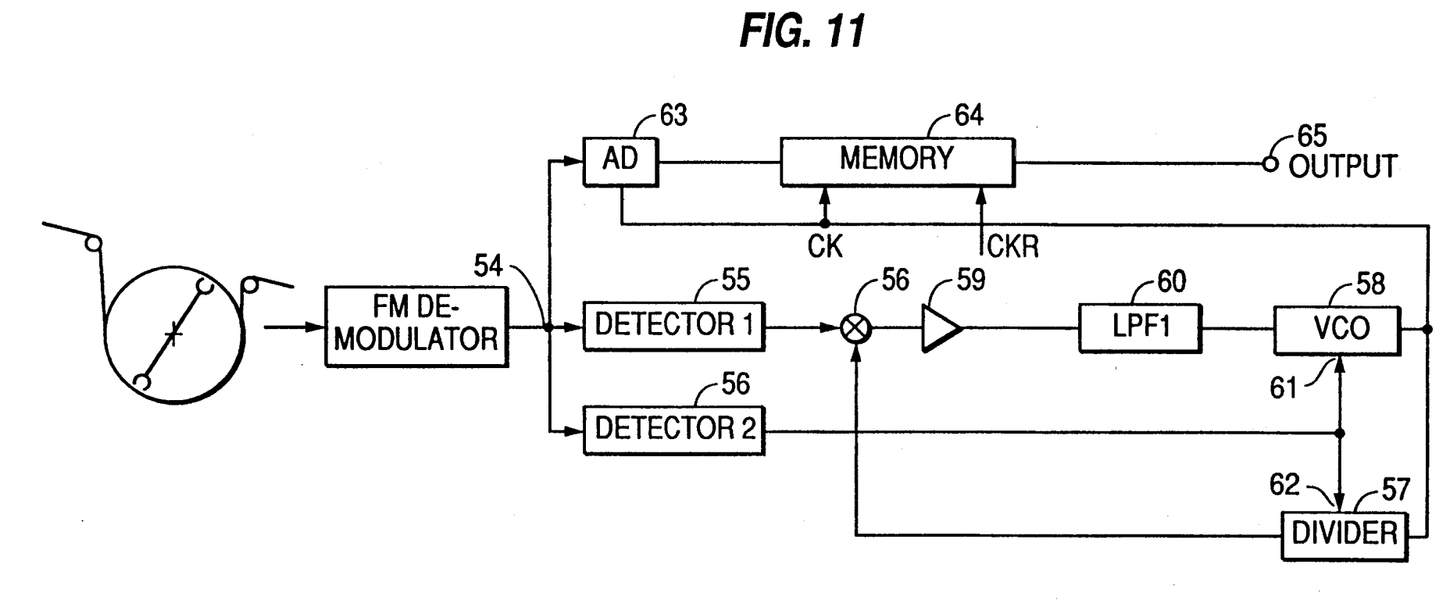
FIG. 11 is a block diagram of a modified timebase corrector.
Figure 14:
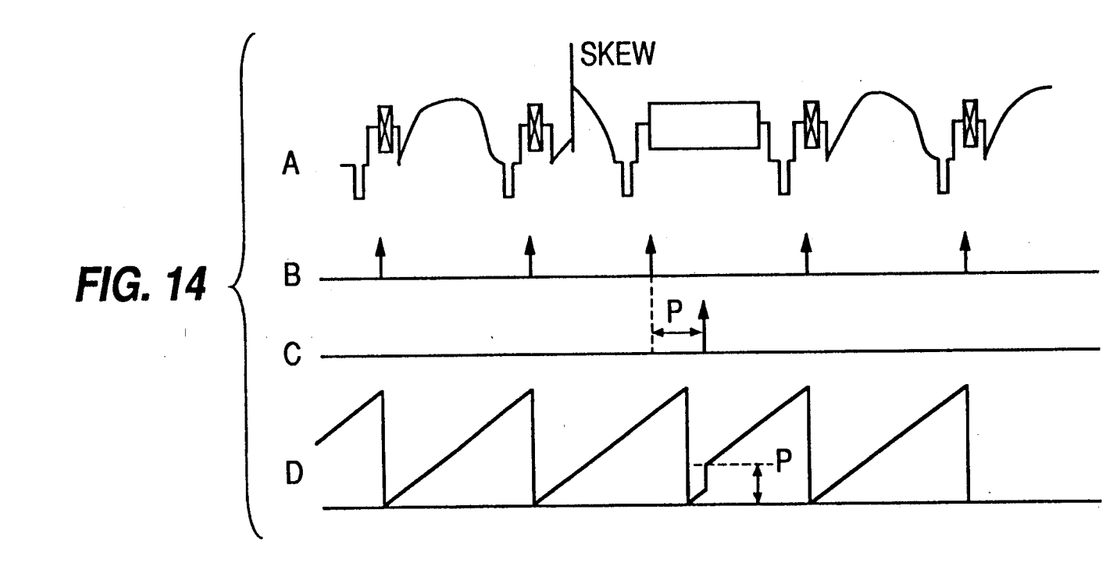
FIG. 14 is a waveform diagram of the modified timebase corrector shown in FIG. 11.

FIG. 14 is a timing chart showing the actions of primary parts of the timebase corrector shown in FIG. 11. More particularly, FIG. 14-A illustrates a waveform of a signal contained within the beginning region of each track signal of the input video signal which contains skew components. FIGS. 14-B and 14-C respectively represent two outputs of the first and second detector circuits 55 and 56. FIG. 14-D shows a preset amplitude of the divider 57 determined by the output of the second detector circuit 56. It should be noted that the preset amplitude P is equivalent to a clock difference (denoted by P in FIG. 14-C) between the pulse output of the first detector 55 and the pulse output of the second detector 56. This results from the fact that the pulse output of the second detector 56 is delayed by P from the pulse output of the first detector 55.

Although the number of recording channels is not specifically defined in this embodiment, it may arbitrarily be determined for VCR multi-channel recording operation in which a video signal of each channel can successfully be processed according to the present invention.

What is claimed is:

1. An apparatus for recording a video signal onto tracks of a recording tape and reproducing the recorded video signal comprising:

a means for producing a first time-base reference signal which is a color burst signal composed of a first predetermined number of sinewave cycles and a second time-base reference signal which is a burst signal composed of a second predetermined number of sinewave cycles, the second predetermined number being larger than the first predetermined number;

a superimposing means for superimposing the first time-base reference signal on an input video signal at intervals of a horizontal scanning period of the video signal and for superimposing the second time-base reference signal on the input video signal at intervals of a predetermined plurality of horizontal scanning periods of the video signal;

a modulating means for modulating an output signal of said superimposing means to obtain a modulated signal;

a recording and reproducing means for recording the modulated signal onto the tracks of the recording tape and for reproducing the recorded signal from the video tape to obtain a reproduced modulated signal;

a demodulating means for demodulating the reproduced modulated signal to obtain a reproduced video signal; and a time-base corrector for correcting a time-base error of the reproduced video signal by using the first and second time-base reference signals contained in the reproduced video signal; said time-base corrector comprising:

a first detecting means for detecting the first time-base reference signal from the reproduced video signal;

a second detecting means for detecting the second time-base reference signal from the reproduced video signal;

a clock generating means responsive to output signals of the first and second detecting means for generating a clock signal having the same time-base error as that of the reproduced video signal;

an analog-to-digital converter responsive to the clock signal generated by said clock generating means for converting the reproduced video signal to a digital video signal; and a memory means which is responsive to the clock signal generated by said clock generating means for writing thereinto the digital video signal from the analog-to-digital converter and which is responsive to an externally provided fixed-phase clock for reading the written digital video signal to obtain a time-base error corrected video signal.

2. An apparatus according to claim 1, wherein said clock generating means comprises:

a voltage-controlled oscillator for producing an oscillation signal which is outputted as said clock signal;

a first phase comparing means for comparing a phase of the output signal of the first detection means with a phase of the oscillation signal;

a first loop filter for passing a low frequency component of an output signal of the first phase comparing means;

a second phase comparing means for comparing a phase of the output signal of the second detecting means with the phase of the oscillation signal;

a second loop filter for passing a low frequency component of an output signal of the second phase comparing means; and a switch means for normally feeding an output signal of the first loop filter to said voltage-controlled oscillator, said switch means being responsive to the output signal of the second detector for feeding an output signal of the second loop filter to said voltage-controlled oscillator during an occurrence of the second time-base reference signal.

3. An apparatus according to claim 2, wherein said second loop filter has a wider frequency band than a frequency band of said first loop filter.

4. An apparatus according to claim 1, wherein said clock generating means comprises:

a voltage-controlled oscillator for producing an oscillation signal which is outputted as said clock signal;

a frequency divider for dividing a frequency of the oscillation signal;

a phase comparing means for comparing a phase of the output signal of the first detecting means with a phase of an output signal of said frequency divider; and a loop filter for passing a low frequency component of an output signal of the phase comparing means, and wherein said second detecting means includes a means for producing, upon detection of the second time-base reference signal, a reset signal which is applied to said frequency divider for resetting said frequency divider.

* * * * *